United States Patent Office 3,074,684
Patented Jan. 22, 1963

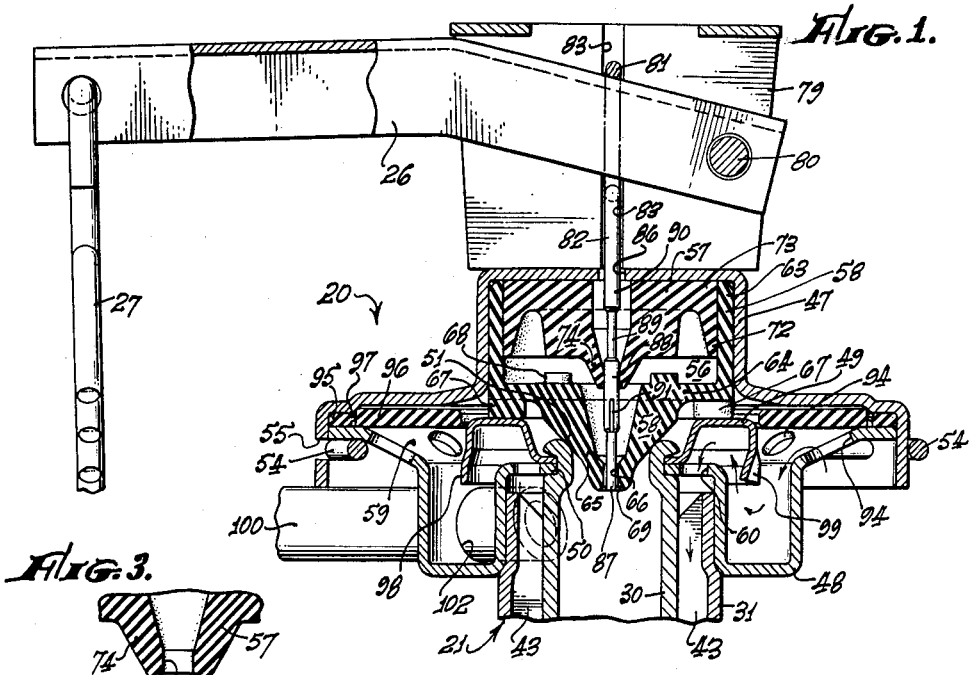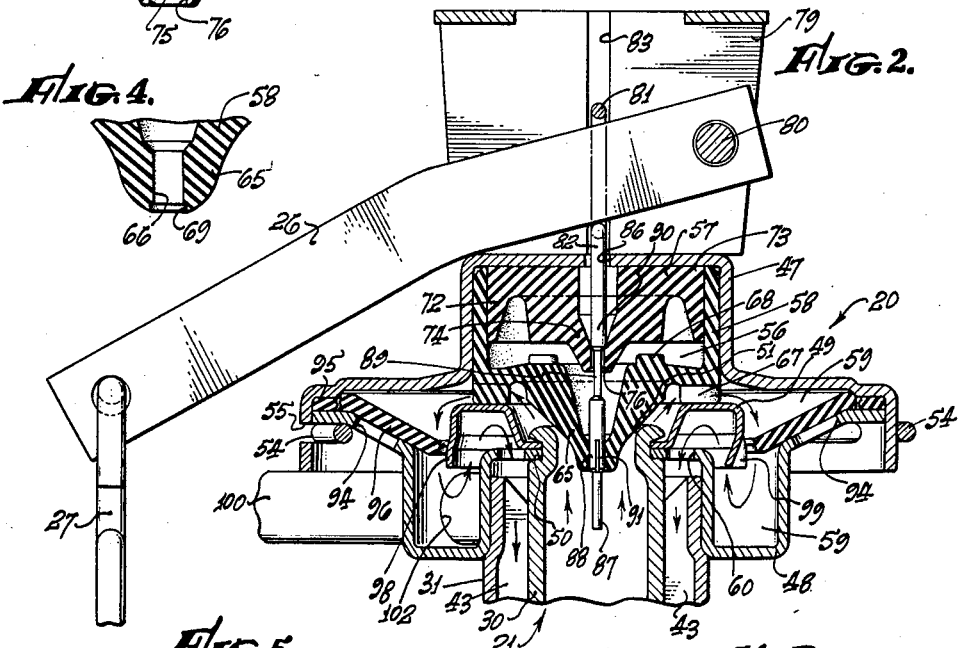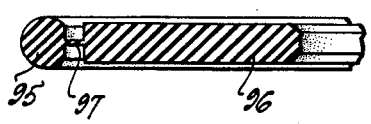

3,074,684
VALVE WITH POSITIVE SHUTOFF
Orville K. Doyle, 1501 E. Commonwealth,
Fullerton, Calif.
Original application Oct. 25, 1957, Ser. No. 692,484, now Patent No. 2,986,155, dated May 30, 1961. Divided and this application Mar. 6, 1961, Ser. No. 93,450
4 Claims. (Cl. 251—35)

This application is a division of my copending application entitled Valve, Serial No. 692,484, filed October 25, 1957, now Patent No. 2,986,155.

This invention relates to valves and, in particular, to a valve which may be used in a flush tank or the like in substitution for the conventional ball cocks customarily used. Although the invention is described as incorporated in a flush tank valve, the principles thereof are manifestly applicable in other environments and to other uses.

It is an object of the invention to provide certain improvements on the ball cock valve described in my earlier patent entitled Ball Cock Valve, No. 2,808,850.

In the valve of the invention, a portion of the incoming fluid is channeled into a pressure chamber formed of a flexible, temporarily deformable material, the fluid under pressure exerting forces against the inner walls of the pressure chamber to make the chamber fluid tight, to hold the chamber in position, and to flex a wall of the chamber into engagement with a valve seat shutting off the flow of fluid through the valve. The incoming fluid enters the pressure chamber through a first passage and exits through a second passage, the two passages being sealed and opened by a single rod moving in both passages. It is an object of the invention to provide such a valve in which the rod has a plurality of operating surfaces therealong such that the valve always closes after emptying of the tank, even though the float, stopper and/or lever mechanisms malfunction, such valve also retaining the full flow rate, the nonhammer shutoff and the low operating pressure features of my earlier valves. Another object of the invention is to provide such a valve in which the sealing engagement of the rod and chamber which serves to block the passage connecting the incoming fluid to the pressure chamber has a slight discontinuity permitting leakage through the passage to expand the pressure chamber and positively close the valve in about fifteen to thirty minutes following opening of the valve.

Other improvements in valve construction and additional novel combinations and arrangements of parts will more fully appear in the course of the following description. The drawings merely show and the description merely describes preferred embodiments of the present invention which are given by way of illustration or example.

In the drawing, wherein like parts in different figures are designated by the same numerals:

FIG. 1 is an enlarged sectional view showing the valve of the invention in the off or closed position;

FIG. 2 is a view similar to FIG. 1 showing the valve in the on or open position;

FIG. 3 is an enlarged view showing the center trip of the upper seal of FIG. 1;

FIG. 4 is an enlarged view showing the center tip of the lower seal of FIG. 1; and FIG. 5 is an enlarged view showing a portion of the anti-syphon seal of FIG. 1.

Reference may be made to my copending application Serial No. 692,484, now Patent No. 2,986,155, for a general description of the valve and its installation. This specification is directed to the valve housing and contents normally positioned atop the inlet pipe.

The housing 20 includes an upper wall element or cap 47, a lower wall element or base 48 and a seal unit support or plate 49 (FIGS. 1 and 2). The base 48 and plate 49 are fixed to the upper end of the standpipe by suitable means, such as by resting the base and plate on a shoulder 50 formed at the upper end of the inlet pipe 30 and rolling over the end of the inlet pipe to hold the parts in place, the rolled-over end serving as a valve seat 51. The base 48 also telescopingly engages the upper end of the outlet pipe 31.

The cap 47 of the housing 20 is assembled to the base 48 by a snap ring 54 which passes through a plurality of openings 55 in the outer periphery of the cap 47 and slides under the outer flange of the base 48 (FIG. 1). This method of assembly permits the cap 47 and the lever 26 to be rotated relative to the standpipe after the standpipe and coupling are mounted in the bottom of the tank.

The housing 20 includes a pressure chamber 56 defined by a seal unit comprising an upper seal 57 and a lower seal 58, and an outlet chamber 59 defined by the cap 47 and base 48. When the valve is in the off position, the seal unit is caused to expand so that the lower seal 58 engages the valve seat 51, as seen in FIG. 1, blocking flow of fluid from the inlet pipe to the outlet chamber and outlet pipe. When the valve is in the on position, the lower seal 58 is in its normal or relaxed position, as shown in FIG. 2, permitting flow of fluid from the inlet pipe into the outlet chamber and through openings 60 in the base 48 into the outlet pipe, as shown by the arrows.

The upper and lower seals 57, 58 are telescopingly positioned within the cap 47 so as to be readily removable when the housing is disassembled, and are made of a flexible, temporarily deformable material, such as rubber. The lower seal 58 includes a cylindrical wall 63, a flexible wall or diaphragm 64 adjoining the lower edge of the wall 63, and a boss 65 extending downward from the central portion of the diaphragm with an opening 66 therethrough (FIGS. 1 and 4). Spaced bosses 67 extend downward from the edge of the diaphragm 64 and rest on the plate 49 to space the diaphragm from the valve seat when the diaphragm is in the relaxed or valve open position. Spaced bosses 68 extend upward from the diaphragm 64 into the pressure chamber 56 preventing complete collapse of the pressure chamber under extreme pressure operations. The seals 57, 58 are preferably molded of rubber or the like and a small counterbore 69 is provided at the lower end of the opening 66 to prevent molding flash from extending into the opening.

The upper seal 57 includes a cylindrical wall 72, a flat portion or plate 73 adjoining the upper end of the wall 72, and a boss 74 extending downward from the plate into the pressure chamber, the boss having an opening 75 therethrough with a counterbore 76 at the lower end thereof (FIGS. 2 and 3).

A bracket 79 with an inverted U-shape is fixed to the top of the cap 47 of the housing 20 by suitable means such as welding or clamping and the valve actuating lever 26 is pivotally mounted in the bracket 79 on a rivet 80 (FIG. 1). The lever 26 is passed through an eye or loop 81 of a valve-actuating rod 82 with the loop of the rod sliding in vertical grooves 83 in the walls of the bracket 79, thereby coupling the vertical movement of the float 25 to the valve-actuating rod 82.

The valve-actuating rod 82 slidingly engages the upper and lower seals 57, 58 at the openings 75, 66, respectively, passing through an opening 86 in the cap 47, and controls the flow of fluid into and out of the pressure chamber 56. The rod 82 is provided with an end section 87, a section 88 of greater cross-sectional area, a section 89, of lesser cross-sectional area, and another section 90 of greater cross-sectional area. Preferably a portion of the section 88 adjacent the end section 87 is relieved, such as by an axial groove 91, to provide a discontinuity along the surface of the section 88. The lower portion of the section 88 may be relieved by other methods such as by providing scratches along the surface or by sandblasting, peening, etching, or the like to provide irregularities over the surface. Alternatively, a groove or other discontinuity may be provided in the inner face of the opening 66 of the lower seal 58.

When the valve is in the off position, as shown in FIG. 1, the end section 87 is positioned in the opening 66 and, being smaller than the opening, permits flow of fluid from the inlet pipe 30 into the pressure chamber 56. The section 88 of the rod is positioned in the opening 75 of the upper seal, blocking the opening. Fluid pressure in the pressure chamber acting over the entire surface of the diaphragm 64 of the lower seal forces the diaphragm downward into engagement with the valve seat 51 and prevents fluid flow from the inlet pipe to the outlet chamber and outlet pipe. When the tank is being emptied, the float moves downward and causes the rod 82 to also move downward. The section 89 of the rod is moved into the opening 75 of the upper seal and, being smaller than the opening, permits fluid flow from the pressure chamber to the surrounding atmosphere. Also, the section 88 of the rod is moved into the opening 66 of the lower seal, substantially blocking the opening. When the pressure chamber is permitted to exhaust, as described above, the diaphragm of the lower seal is raised to its normal position, as shown in FIG. 2, permitting fluid flow through the valve.

With the valve in the open position, the tank will normally fill in about half a minute. As the fluid level approaches the desired position, the float will cause the rod to move upward moving the section 88 of the rod into engagement with the opening in the upper seal and out of engagement with the opening in the lower seal, permitting the pressure chamber to fill with fluid from the inlet pipe to expand the chamber and shut off fluid flow.

An important feature of the present invention provides for shutting off the valve after a predetermined period of time when the tank does not fill due to some malfunction in the system. When the rod is at the lower extreme of its travel, as shown in FIG. 2, the section 90 of the rod will engage the opening 75 of the upper seal preventing fluid flow through the opening. At the same time, the relieved portion of the section 88 will be positioned in the opening 66 of the lower seal permitting very slight fluid flow from the inlet pipe to the pressure chamber. The relieved portion is so dimensioned that it preferably will require 15 to 30 minutes for sufficient fluid to flow through the opening 66 into the pressure chamber to expand the pressure chamber and close the valve. Of course, the time period may be varied as desired. This construction prevents fluid flow through the valve for any extended period of time in the event the stopper in the tank does not seat properly, or the float becomes jammed or disengaged, or any other malfunction occurs.

It is required in most flush tank valve installations that means be provided for preventing syphoning of fluid through the valve. Openings 94 are provided in a side of the base 48 providing communication between the outlet chamber 59 and the surrounding atmosphere, the side of the base containing the openings preferably being frusto-conical in shape. These openings permit air flow into the outlet chamber and outlet pipe as shown by the arrows in FIG. 1, serving as an anti-syphon device. A deflectable anti-syphon flap is provided in the outlet chamber to cover the openings 94 and substantially prevent fluid flow through the openings when the valve is in the on position. A preferred form for the anti-syphon seal is shown in FIGS. 1, 2 and 5, the seal comprising an outer ring 95 and an inner annular disc 96 joined by a thin web 97, the seal being formed of an elastic material such as rubber or the like. The seal is positioned between the cap and base when the housing is assembled, the outer ring 95 being clamped therebetween with the disc disposed within the outlet chamber 59.

The disc 96 is shown in its normal or relaxed position in FIG. 1, permitting air flow into the outlet chamber through the openings 94. When there is fluid flow from the inlet pipe into the outlet chamber, as shown in FIG. 2, the disc is deflected or stretched downward by the fluid to cover the openings 94. As soon as the fluid flow ceases, the disc returns to its normal position as shown in FIG. 1. It is not necessary that the disc 96 be formed with the ring 95 and web 97. However, this form is preferred because it permits the disc to be easily and accurately positioned in the outlet chamber during the assembly of the housing. The web 97 is made quite thin so as not to affect the flexibility of the disc and the web may break away during operation, as shown in FIG. 2, although this is not preferred.

Fluid flow takes place downward through the annular opening between the inner edge of the disc 96 of the anti-syphon seal and an outer wall 98 of the seal unit support on plate 49. It is preferred to maintain the size of this opening substantially constant and independent of the position of the anti-syphon flap, since such construction materially increases the operating range of the valve. In the embodiment shown herein, this opening is made substantially constant by outwardly flaring the wall 98 of the plate 49 so that the outer surface of the wall in vertical cross section approximates an arc of a circle with its center at the web 97 of the seal, as seen in FIGS. 1 and 2. A dimple 99 in the wall 98 permits dirt and other particles to pass through the opening.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a valve having a housing enclosing a valve seat intermediate an inlet and an outlet, the combination of:
   seal means defining a pressure chamber and positioned within the housing, said seal means having first and second openings therein with flow paths therethrough for fluid communication with said pressure chamber, said second opening being located in a flexible wall of said seal means, said wall being so positioned that when flexed in one direction it will engage the valve seat to block flow of fluid between the inlet and the outlet, said first opening connecting said pressure chamber to an exhaust, said second opening connecting said pressure chamber with the inlet;
   and control means engageable with said first and second openings and movable between off and on positions for closing said first opening when in an off position, and closing said first opening and said second opening when in an on position, and opening said first opening when in a position intermediate said off and on positions, said control means including means defining a leakage path through said second opening when in said on position, which leakage path is small relative to the flow path through said second opening when in said off position.

2. In a valve having a housing enclosing a valve seat intermediate an inlet and an outlet, the combination of:
   seal means defining a pressure chamber and positioned within the housing, said seal means having first and second openings therein for fluid communication with said pressure chamber, said second opening being located in a flexible wall of said seal means, said wall being so positioned that when flexed in one direction it will engage the valve seat to block flow of fluid between the inlet and the outlet, said first opening connecting said pressure chamber to an exhaust, said second opening connecting said pressure chamber with the inlet;

a rod engageable with said first and second openings for blocking flow of fluid through said openings when in particular positions, said rod having an end section, a first enlarged section, a reduced section, and a second enlarged section, with that portion of said first enlarged section which engages said second opening having a slightly relieved portion;

and means coupled to said rod for moving said rod from an off position through an intermediate position to an on position and return, with said end section positioned in said second opening and the unrelieved portion of said first enlarged section positioned in said first opening for closing said first opening when in said off position, and with said relieved portion of said first enlarged section positioned in said second opening for nearly closing said second opening and said second enlarged section positioned in said first opening for closing said first opening when in said on position, permitting very slight fluid flow between the inlet and said pressure chamber along said relieved portion, and with said reduced section positioned in said first opening when in said intermediate position.

3. In a valve having a housing enclosing a valve seat intermediate an inlet and an outlet, the combination of:

a removable seal unit positioned within the housing and defining a pressure chamber, said unit having first and second openings therein for fluid communication with said pressure chamber, said second opening being located in a flexible wall of said unit, said wall being so positioned that when flexed in one direction it will engage the valve seat to block flow of fluid between the inlet and the outlet, said first opening connecting said pressure chamber to an exhaust, said second opening connecting said pressure chamber with the inlet;

means for retaining said seal unit within the housing;

a rod engageable with said first and said second openings for blocking flow of fluid through said openings when in particular positions, said rod having an end section, a first enlarged section, a reduced section, and a second enlarged section, with that portion of said first enlarged section which engages said second opening having a slightly relieved portion;

and means coupled to said rod for moving said rod from an off position through an intermediate position to an on position and return, with said end section positioned in said second opening and the unrelieved portion of said first enlarged section positioned in said first opening for closing said first opening when in said off position permitting expansion of said pressure chamber for engaging said wall with the valve seat, and with said reduced section positioned in said first opening when in said intermediate position permitting relaxation of said pressure chamber, and with said relieved portion of said enlarged section positoned in said second opening for nearly closing said second opening and said second enlarged section positioned in said first opening for closing said first opening when in said on position, permitting very slight fluid flow between the inlet and said pressure chamber along said relieved portion for slowly expanding said pressure chamber.

4. In a valve having a housing enclosing a valve seat intermediate an inlet and an outlet, the combination of:

seal means defining a pressure chamber and positioned within the housing, said seal means having first and second openings therein with flow paths therethrough for fluid communication with said pressure chamber, said second opening being located in a flexible wall of said seal means, said wall being so positioned that when flexed in one direction it will engage the valve seat to block flow of fluid between the inlet and the outlet, said first opening connecting said pressure chamber to an exhaust, said second opening connecting said pressure chamber with the inlet:

a flow control rod engageable with said first and second openings for blocking flow of fluid through said openings when in particular positions, said rod having an end section, a first enlarged section, a reduced section, and a second enlarged section, with a portion of said first enlarged section which engages said second openings having a slightly relieved portion;

and means coupled to said rod for moving said rod from an off position through an intermediate position to an on position and return, with said end section positioned in said second opening and an unrelieved portion of said first enlarged section positioned in said first opening for closing said first opening when in said off position, and with said relieved portion of said first enlarged section positioned in said second opening for nearly closing said second opening and said second enlarged section positioned in said first opening for closing said first opening when in said on position, permitting very slight fluid flow between the inlet and said pressure chamber along said relieved portion, and with said reduced section positioned in said first opening and said first enlarged section positioned in said second opening when in said intermediate position.

References Cited in the file of this patent
UNITED STATES PATENTS

| | | |
|---|---|---|
| 1,034,826 | Payne | Aug. 6, 1912 |
| 2,808,850 | Doyle | Oct. 8, 1957 |